UNITED STATES PATENT OFFICE.

GEORGE H. WOOSTER, OF NEW YORK, N. Y.

MATERIAL FOR THE TREATMENT OF WALLS.

SPECIFICATION forming part of Letters Patent No. 471,163, dated March 22, 1892.

Application filed November 9, 1891. Serial No. 411,369. (No specimens.)

*To all whom it may concern:*

Be it known that I, GEORGE H. WOOSTER, a citizen of the United States, residing in the city of New York, county of New York, and State of New York, have made a new and useful Improvement in Materials for the Treatment of Walls, of which the following is a specification.

My invention relates to a composition of matter which when compounded and placed in barrels or other suitable packages may be stored away and kept until further order, and when to be used can be shipped to the place of use, when it can by the addition of sufficient water be rendered suitable for application to the wall or put to any other use which may be desired.

My invention consists of a composition of matter comprising the following ingredients prepared and combined as hereinafter set forth, viz: ground or comminuted plaster-of-paris of commerce, ground or comminuted alum, a fibrous material, as wool, hair, asbestus, or any other of the well-known animal or vegetable fibers, and ground marble.

The preferred proportions are as follows: About one-third of a barrel of the mixture should comprise the plaster-of-paris with about one pound of alum and the other two-thirds the ground marble, with sufficient fibrous material distributed through the mass as a binder, although the proportions can be made to suit the work in which the mixture is to be used; or if the mixture is to be compounded by weight the following proportions may be used: five hundred pounds of marble, two hundred and fifty pounds of plaster, one to five pounds of alum, and one to five pounds of fibrous material. The addition of ground marble to the other ingredients is for the purpose of giving a body to the mixture, and besides it gives a very fine finish to the work and can be satisfactorily used for a white or finish coat. The ground marble is preferably reduced to a fine condition of comminution, so that it may be intimately distributed in the mass, and it may be prepared in any well-known manner. The fibrous material can be added to the mass in the condition most desired, as sometimes it is preferable to use short fibers and at other times long fibers; but it should always be thoroughly incorporated in the mass. It gives strength and elasticity to the wall and keeps it from cracking, as well as making the mass work easier.

The ground alum when thoroughly incorporated in the mass acts as a restrainer for the setting of the plaster and can be added in any quantity, according to the time it is determined to give the plaster to set. It also has a tendency to harden the resulting wall, increasing the density of the plaster, and enables it to resist heat. I intend to mix the alum with the plaster while being calcined.

A very good method of compounding my mixture is to get the different ingredients properly proportioned and treated and put them in a mechanical mixer, agitating the mass until a thorough distribution of it has taken place. The ingredients can be separately treated and proportioned and shipped to the place of use and there mixed together; but I prefer the before-mentioned method.

When the ingredients have been compounded, the mixture can be kept for an indefinite length of time and is quickly made ready for use by adding water in proper quantity.

What I claim is—

The herein-described composition of matter, comprising plaster-of-paris, alum, a fibrous material, and ground marble, substantially as herein set forth.

Signed at the city, county, and State of New York this 6th day of November, 1891.

GEORGE H. WOOSTER.

Witnesses:
H. F. DURBEN,
M. F. DALY.